United States Patent
Smith

(12) 
(10) Patent No.: US 6,625,503 B1
(45) Date of Patent: Sep. 23, 2003

(54) PERSONAL PREFERENCE INFORMATION COMMUNICATION METHOD AND APPARATUS

(75) Inventor: Dwight Randall Smith, Grapevine, TX (US)

(73) Assignee: Motorola, Inc., Schaumburg, IL (US)

( * ) Notice: Subject to any disclaimer, the term of this patent is extended or adjusted under 35 U.S.C. 154(b) by 397 days.

(21) Appl. No.: 09/590,593

(22) Filed: Jun. 9, 2000

(51) Int. Cl.[7] ............................................. G05B 15/00
(52) U.S. Cl. ............................. 700/83; 700/17; 700/19; 700/20; 700/65; 700/66; 345/173; 345/810; 345/866; 707/104.1; 707/500.1; 709/227; 709/217; 379/211.02
(58) Field of Search ............................. 700/25, 17, 83, 700/19, 20, 65, 66; 345/173, 810, 866; 707/104.1, 1, 500.1; 709/227, 217; 725/25, 37, 78; 379/211.02

(56) References Cited

U.S. PATENT DOCUMENTS

| | | | |
|---|---|---|---|
| 5,404,440 A | * 4/1995 | Asahi | 345/746 |
| 5,422,656 A | * 6/1995 | Allard et al. | 345/173 |
| 5,682,460 A | * 10/1997 | Hyziak et al. | 707/104.1 |
| 6,137,484 A | * 10/2000 | Hoddie et al. | 707/500.1 |
| 6,157,935 A | * 12/2000 | Tran et al. | 382/187 |
| 6,178,443 B1 | * 1/2001 | Lin | 707/104.1 |
| 6,198,996 B1 | * 3/2001 | Berstis | 701/36 |
| 6,289,466 B1 | * 9/2001 | Bayramoglu et al. | 710/10 |
| 6,351,596 B1 | * 2/2002 | Ostrover | 439/417 |
| 6,397,262 B1 | * 5/2002 | Hayden et al. | 345/418 |

\* cited by examiner

*Primary Examiner*—Ramesh Patel
(74) *Attorney, Agent, or Firm*—Hisashi D. Watanabe

(57) ABSTRACT

A method of setting user control preferences where a personal communication device communicates user control preferences to a control device. The control device controls the controllable attributes of a location in accordance with the user control preferences. In addition, general control preferences can be communicated to the control device followed by manual adjustment of the controllable attributes where the adjusted controllable attributes are communicated to the personal communication device and stored therein.

29 Claims, 5 Drawing Sheets

PERSONAL PREFERENCE INFORMATION COMMUNICATION METHOD AND APPARATUS

FIELD OF THE INVENTION

The present invention relates to maintaining a user's control preferences which can be communicated to a device which controls the controllable attributes of a controllable entity.

BACKGROUND OF THE INVENTION

Technology has seen the development of so called "smart cars." For example, some cars can store user preferences for a set of drivers. Other selectable features, such as climate settings, radio stations and CD play lists are also candidates for such stored preferences. However, these preferences cannot be transferred to other vehicles.

It would be desirable if these stored preferences could be taken with a user to other vehicles, such as a rental car, for example. It is further desirable to provide such stored control preferences in other transient controllable entities, such as hotel rooms, for example.

In light of the foregoing limitations of the prior art, there is a need for a method in which a user's control preferences can be stored in a personal communication device to be communicated to a control device which controls the controllable attributes of a controllable entity, such as a car or a hotel room, for example. Alternatively, the personal communication device may pass an indirect reference, e.g., a URL, to the control device, which could then host the user's control preferences.

BRIEF DESCRIPTION OF THE DRAWINGS

The features of the present invention that are believed to be novel are set forth with particularity in the appended claims. However, the invention together with further advantages thereof, may be best understood by reference to the accompanying drawings wherein:

DETAILED DESCRIPTION OF THE PREFERRED EMBODIMENT

Figure 1:
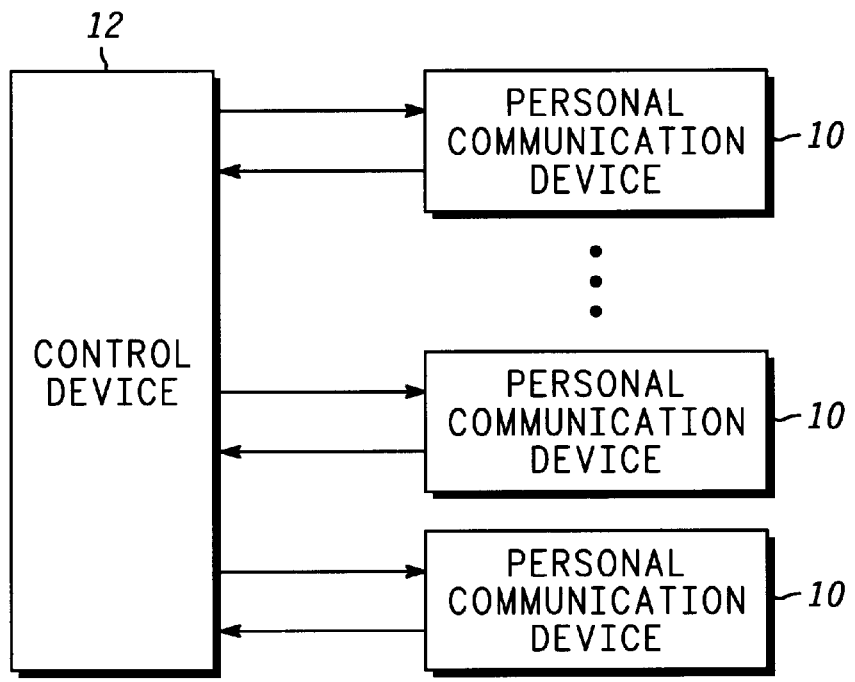
FIG. 1 is a diagram of an overall user control preference setting system according to an embodiment of the present invention.

FIG. 1 is a diagram of an overall user control preference setting system according to an embodiment of the present invention. Referring to FIG. 1, a personal communication device 10 is a device which is preferably portable and capable of wirelessly receiving, transmitting, storing and processing information. Examples of such a device include a cellular telephone, a personal digital assistant, etc. Any suitable off-the-shelf communication device suitably modified according to the teachings herein may be used. Such devices equipped to support Bluetooth enabled services or the like may be particularly suitable. In an embodiment of the present invention, more than one personal communication device may be accommodated in the present system.

In a preferred embodiment, personal communication device 10 transmits and receives information to and from a control device 12. Control device 12 is preferably capable of setting and adjusting the controllable attributes of a controllable entity in which control device 12 is located.

Data is preferably stored according to attribute classes for the particular controllable entities. For example, an automobile may have seats and mirrors which will have settings associated with the specific make and brand of the automobile and may have generic attributes for those same items that it associates with a class of automobile. In addition, an automobile may have a radio which would be controllable, but its attributes may be associated separately from those of the automobile since those attributes would be associated with a user's physical location and generic attributes that may be abstracted to cover the type of station in which the user is interested.

Control device 12 can preferably transmit the controllable attributes to personal communication device 10. These transmitted attributes can be stored in personal communication device 10, preferably with a controllable entity type identifier unique to the specific controllable entity type.

Figure 2:
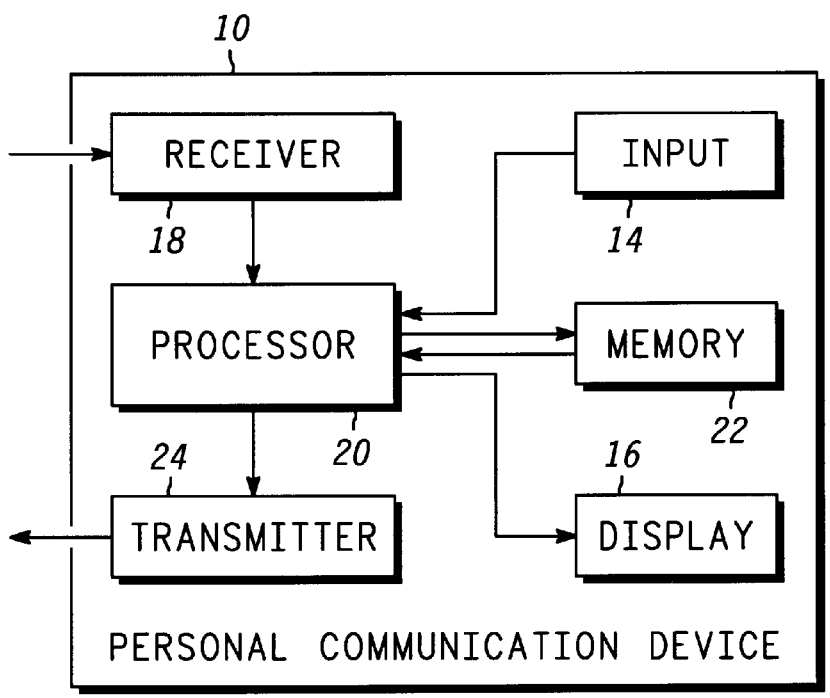
FIG. 2 is a detailed diagram of a personal communication device according to an embodiment of the present invention.

FIG. 2 is a detailed diagram of a personal communication device according to the present invention. Referring to FIG. 2, typically personal communication device 10 has an input unit 14, such as a key pad, for example, and a display 16, such as a liquid crystal display, for example. Inputs may alternatively be generated by communicating with a personal computer or other device. The user of personal communication device 10 may input, through input unit 14, personal user control references which are specific to a controllable entity, i.e., automobile, model type, etc., or general control preferences, which preferably may be manually modified through control device 12 directly by the user, i.e., the driver of the automobile.

Preferably, personal communication device 10 includes a receiver 18 to receive signals from control device 12, for example. Typically, personal communication device 10 also includes a processor 20 to process the received signals or transmit signals and provide general control functions for the device 10. A memory 22 is preferably provided to store information and operating programs. Memory 22 may store data or instructions from processor 20 and output data to processor 20. This data or other data preferably can be transmitted by transmitter 24 of personal communication device 10 to control device 12.

Figure 3:
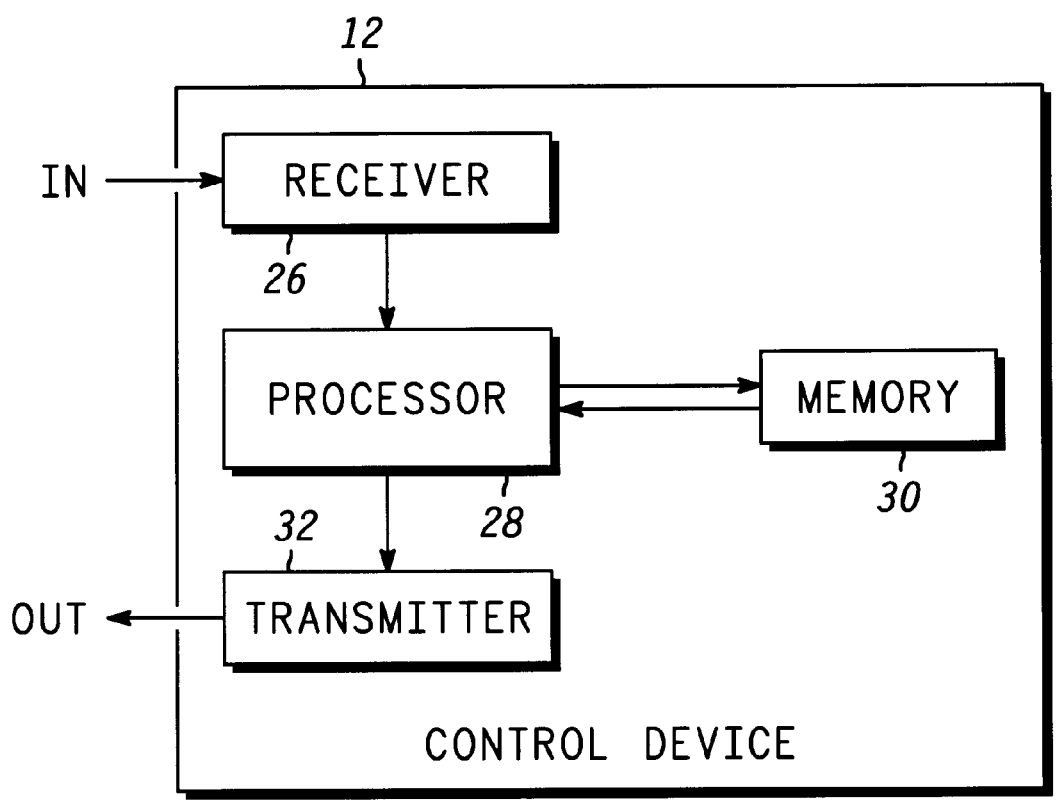
FIG. 3 is a detailed diagram of a control device according to an embodiment of the present invention.

FIG. 3 is a detailed diagram of a control device according to a preferred embodiment of the present invention. Referring to FIG. 3, control device 12 preferably includes a receiver 26 to receive data from personal communication device 10. Receiver 26 preferably outputs the received data to a processor 28. Processor 28 typically accesses a memory 30 to store the data. It should be noted that control device 12 may interact with the controllable entity directly and not utilize memory 30. A transmitter 32 preferably transmits data to personal communication device 10 and control instructions to each of a multiple number of devices, such as a radio, a mirror, etc. (not shown). Alternatively, control device 12 may be directly connected to a number of controllable devices in the controllable entity, such as a radio, a mirror, etc. (not shown), or control device 12 could communicate with the controllable devices through an internal local area network, which is contained completely within the controllable entity (not shown).

Figure 4:
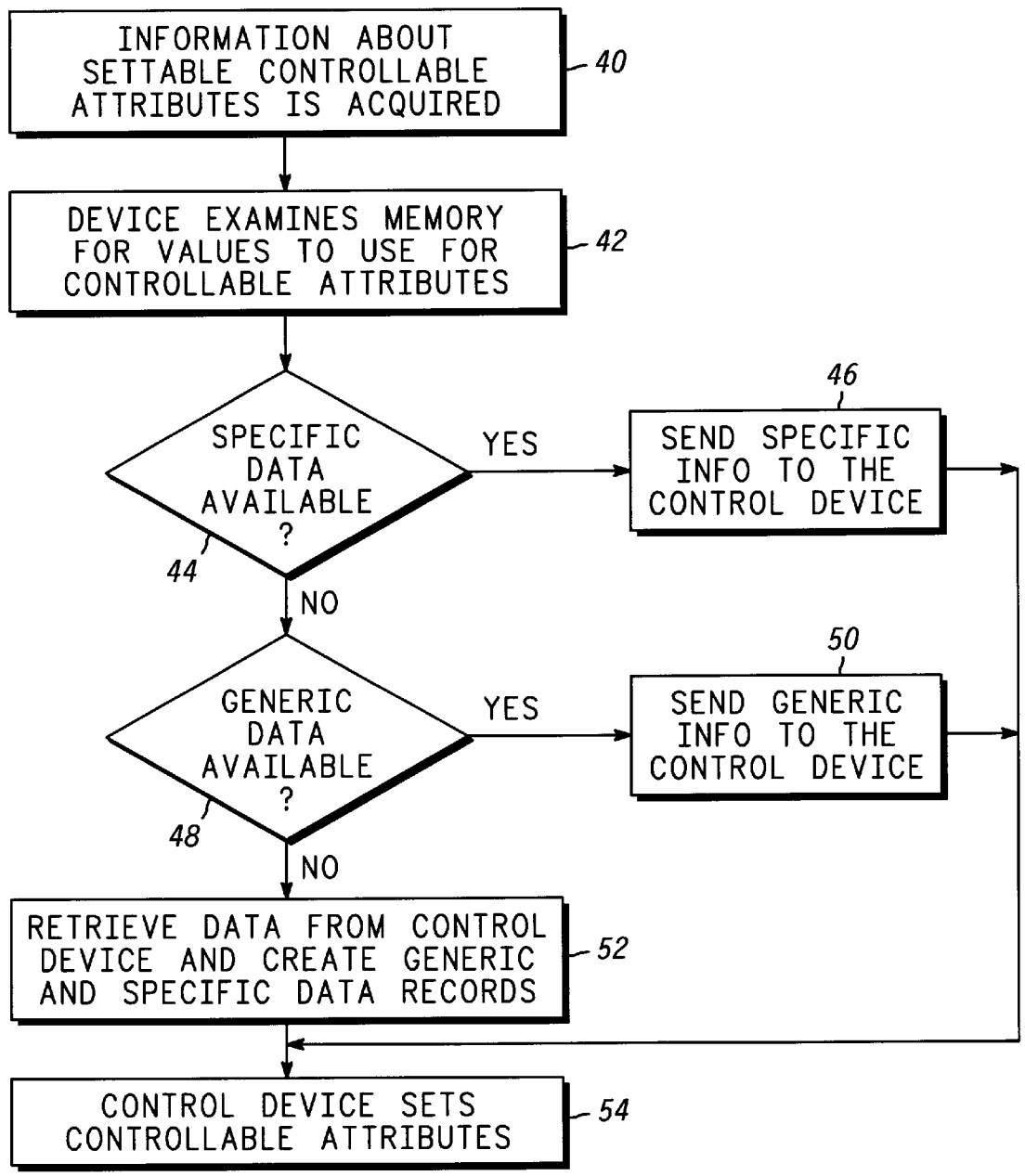
FIG. 4 is a flow chart showing a process by which controllable attributes of a controllable entity are adjusted in accordance with user control preferences according to an embodiment of the present invention.

FIG. 4 is a flow chart showing a process by which controllable attributes of a controllable entity are adjusted in accordance with user control preferences according to an embodiment of the present invention. Referring to FIG. 4, in operation 40, personal communication device 10 typically scans to learn what controllable attributes can be controlled by control device 12.

From operation 40, the process moves to operation 42, where personal communication device 10 examines memory 22 for previously stored values to use for the controllable attributes of the specific controllable entity.

From operation 42, the process moves to operation 44, where it is determined whether such specific data is available to use for the controllable attributes. If there is specific data stored in memory 22 to use for the controllable attributes, the process moves to operation 46, where the specific user control preferences are transmitted to control device 12.

If there is no specific data stored in memory 22 to use for the controllable attributes, the process moves to operation 48, where it is determined whether there is a generic set of data to use for the controllable attributes. If there is a generic set of data, the process moves to operation 50, where the generic data is sent to control device 12.

If there is no generic set of data, the process moves to operation 52, where data is preferably received from control device 12 and generic and specific data sets corresponding to the controllable attributes are typically stored in personal communication device 10.

After operations 46 or 50, in operation 54, control device 12 preferably adjusts the controllable attributes of the controllable entity in accordance with the user control preferences transmitted from personal communication device 10. The operation in which the control device actually controls the individual devices, i.e., the radio in the case of an automobile, is not shown herein. However, it should be understood that this operation could be carried out via a wireless connection between control device 12 and the individual devices or via a hard-wired connection to these devices.

Figure 5:
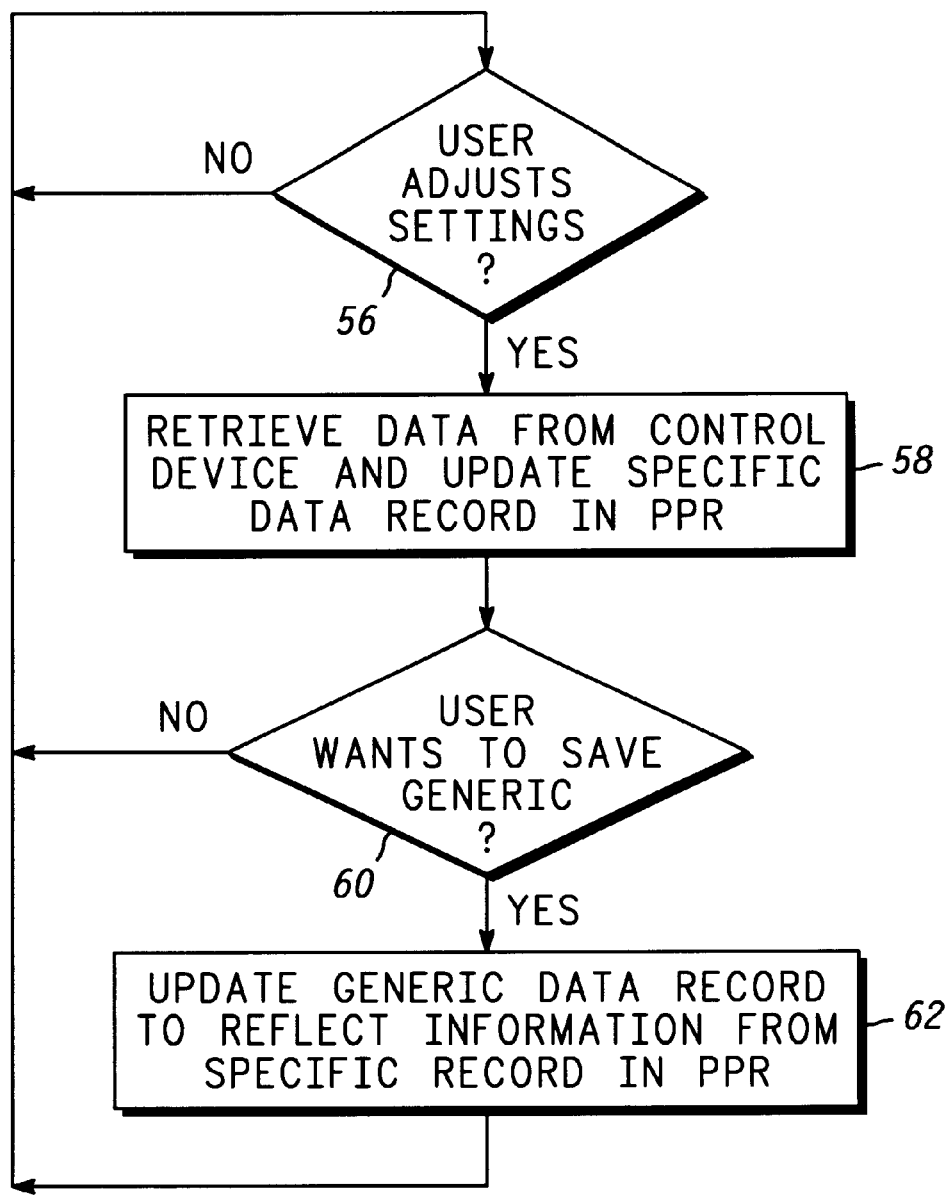
FIG. 5 is a flow chart showing a process by which general control preferences are adjusted for a particular controllable entity type according to an embodiment of the present invention.

FIG. 5 is a flow chart showing a process by which general control preferences are adjusted for a particular controllable entity type according to an embodiment of the present invention. Referring now to FIG. 5, in operation 56, it is determined whether the user has adjusted the controllable attributes of the controllable entity. If the user has adjusted the controllable attributes, the process moves to operation 58, where data is retrieved from control device 12 and a specific data record stored in memory 22 is updated according to the current controllable attributes.

From operation 58 the process moves to operation 60, where it is determined whether the user wants to save the updated specific data record or generic portions thereof to or as a generic controllable settings. If the user does want to save the generic controllable settings, the process moves to operation 62, where a generic data record is updated to store the specific information (specific to the controllable entity) and then returns to operation 56. If at operation 60 the user does not wish to update or save generic portions of the specific record the process of FIG. 5 continues to operation 56. The process shown in FIG. 5 relates to the situation where a user gets into an automobile, for example, adjusts a variety of the controllable attributes therein, i.e., temperature, seat position, and the settings may then be stored for that specific controllable entity or particular automobile model or some generic portion thereof such as the radio.

Figure 6:
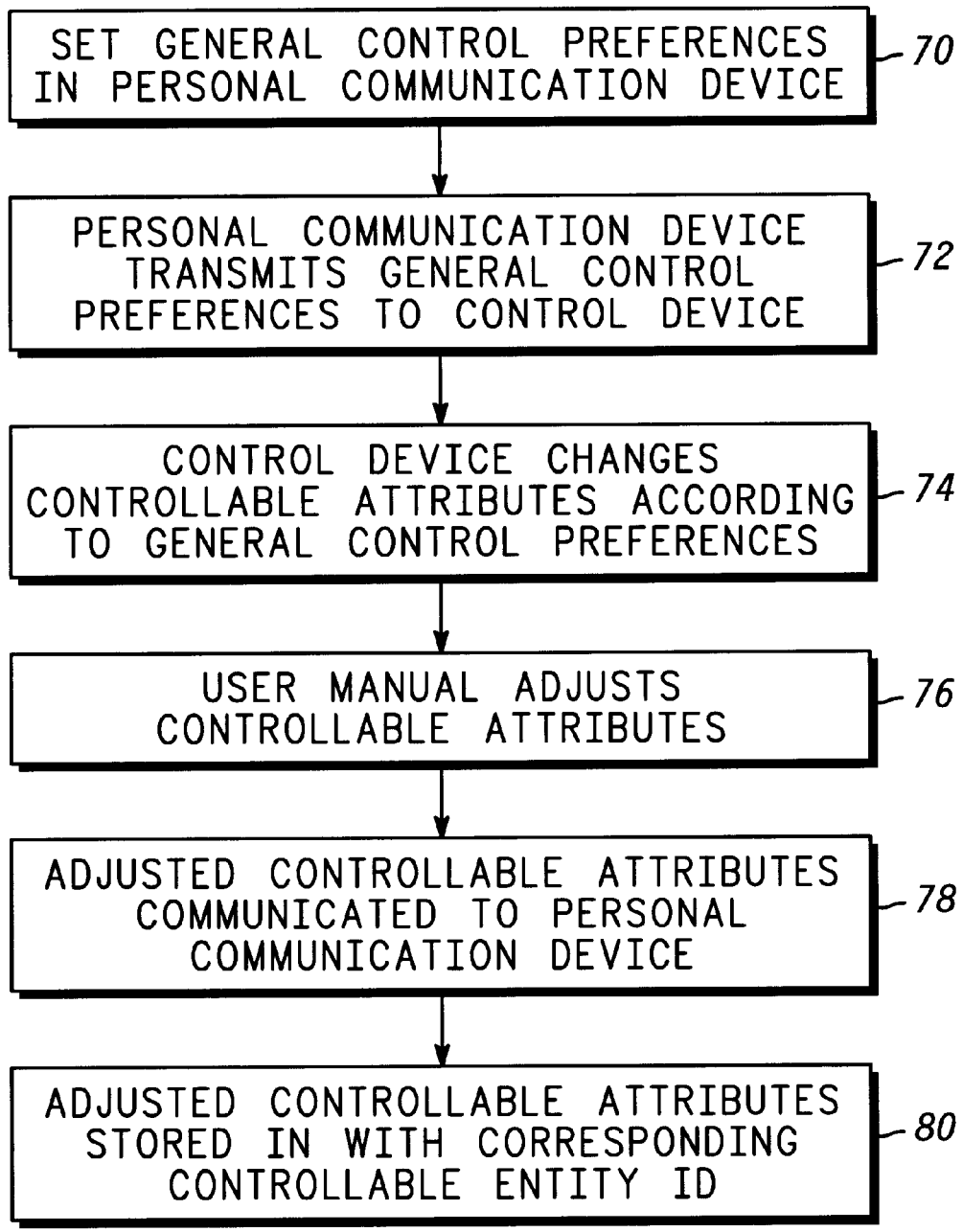
FIG. 6 is a flow chart showing a process by which general control preferences are adjusted for a specific controllable entity according to an embodiment of the present invention.

FIG. 6 is a flow chart showing a process by which general control preferences are adjusted for a specific controllable entity according to an embodiment of the present invention. Referring to FIG. 6, in operation 70, the general control preferences are typically stored in personal communication device 10. However, it should be understood that in an alternative embodiment, the personal communication device may have the general control preferences prestored therein.

From operation 70, the process moves to operation 72, where personal communication device 10 preferably transmits the general control preferences to control device 12.

From operation 72, the process moves to operation 74, where control device 12 preferably adjusts the controllable attributes in accordance with the general control preferences.

From operation 74, the process moves to operation 76, where preferably the user manually adjusts the controllable attributes. In other words, the user may move the seat forward, set the desired temperature, change the radio station presets, etc., depending on the location type.

Optionally, after operation 76, the process moves to operation 78, where the adjusted controllable attributes may be transmitted from control device 12 to personal communication device 10. According to this embodiment, the adjusted controllable attributes are preferably stored in personal communication device 10 with a corresponding controllable entity identifier. According to this embodiment, for example, a user may enter a rental automobile, communicate via personal communication device 10 the general control preferences to control device 12; Then, control device 12 adjusts the controllable attributes in accordance with the general control preferences. However, if the user then decides to adjust the controllable attributes, such as by moving the driver's seat forward, this information is typically transmitted back to personal communication device 10 and preferably stored (operation 80) with a controllable entity identifier, which can identify the automobile model type, for example. Therefore, a person carrying such a personal communication device according to the present invention can easily adjust the controllable attributes of a controllable entity and can store this information for the next time the user is in that particular model type automobile, for example.

It should be understood that the present invention is not limited to controlling the controllable attributes with only one personal communication device. For example, the occasion may arise where several passengers of an automobile have personal communication devices. In this case, preferably control device 12 communicates with each personal communication device 10 to determine their respective seat positions, for example. This could typically be accomplished by a query menu back to each personal communication device 10. Radio settings, for example, could be based on the driver's preference or a vote could be taken. A temperature, for example, could be determined by taking an average of the user preferences. Each personal communication device could also have a pre-assigned priority level which is used to adjust the controllable attributes.

In an embodiment of the present invention, one of the personal communication devices or the control device can perform operations necessary to accommodate multiple user preferences. Further, such user preferences can be stored and accessed in the conjunction with adjusting the controllable attributes.

It should be understood that a variety of other schemes could be used to handle a multiple personal communication device situation according to the present invention.

It should also be understood that although the above discussion relates to an automobile type location, the present system could be used for a hotel room or any other suitable location and the above-description is not intended to limit the scope of the present invention in any manner.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A method of setting user control preferences, comprising:
   determining whether a specific user control preference is available to use for controllable attributes of a controllable entity;
   determining whether a generic user control preference is available to use for the controllable attributes of the controllable entity, if a specific user control preference is unavailable;
   communicating the available user control preferences from a personal communication device to a control device, the control device controlling the controllable attributes of the controllable entity; and
   adjusting the controllable attributes of the controllable entity by the control device in accordance with the user control preferences after communicating the user control preferences from the personal communication device to the control device.

2. The method as claimed in claim 1, wherein the personal communication device is portable and is capable of wirelessly communicating the user control preferences to the control device.

3. The method as claimed in claim 1, wherein the user control preferences are stored in the personal communication device before the personal communication device communicates the user control preferences to the control device.

4. The method as claimed in claim 1, wherein the controllable entity is an interior cabin of an automobile.

5. The method as claimed in claim 4, wherein the controllable attributes comprise at least one of the group consisting of distance of a seat from a gas pedal, height of the seat, an angle of incline of the seat, a temperature of the automobile, a radio station setting, a lighting level in the automobile, mirror positions and humidity settings.

6. The method as claimed in claim 1, wherein the controllable entity is a hotel room.

7. The method as claimed in claim 1, wherein the controllable attributes comprise at least one of the group consisting of an interior temperature, humidity, lighting level, television volume, television channel, alarm clock volume, alarm clock awake time, preferred long distance provider, calling card numbers, network shows, television language, caption settings and preferred cable stations.

8. The method as claimed in claim 4, wherein control attributes are stored in the personal communication device and categorized according to an automobile model type.

9. The method as claimed in claim 5, wherein the radio station setting is controlled by communicating a user programming type preference from the personal communication device to the control device.

10. The method as claimed in claim 9, wherein the control device obtains a geographic location of the personal communication device and determines a radio station corresponding to the user programming type preference for the geographic location.

11. The method as claimed in claim 7, wherein a television channel is controlled by communicating a user programming type preference from the personal communication device to at least one of the group consisting of the control device or the television.

12. A method of setting controllable entity specific control preferences, comprising:
    communicating general control preferences from a personal communication device to a control device, the control device changing controllable attributes in accordance with the general control preferences communicated to the control device from the personal communication device;
    manually adjusting the controllable attributes after the control device changes the controllable attributes in accordance with the general control preferences, the control device detecting the adjusted settings; and
    communicating the manually adjusted controllable attributes from the control device to the personal communication device.

13. The method as claimed in claim 12, wherein the personal communication device stores the adjusted controllable attributes after the adjusted controllable attributes are transmitted from the control device to the personal communication device.

14. The method as claimed in claim 13, wherein a controllable entity identifier corresponding to a specific controllable entity of the control device is manually input to the personal communication device to adjust the controllable attributes of the control device to controllable entity-specific controllable attributes corresponding to the controllable entity identifier.

15. The method as claimed in claim 1, wherein at least one of the control device and the personal communication device adjusts the controllable attributes in accordance with multiple user control preferences.

16. The method as claimed in claim 15, wherein at least one of the control device and the personal communication device queries each of a plurality of personal communication devices to obtain respective seating positions and adjusts the controllable attributes in accordance with the corresponding user control preferences.

17. The method as claimed in claim 16, wherein at least one of the control device and the personal communication device takes an average of a plurality of user control preferences and adjusts the controllable attributes in accordance with the average of the user control preferences.

18. The method as claimed in claim 15, wherein the multiple user control preferences can be stored in respective personal communication devices.

19. The method as claimed in claim 18, wherein voting priorities can be assigned to the personal communication devices, respectively, and the controllable attributes are adjusted in accordance with the voting priorities.

20. A method of setting controllable entity specific control preferences, comprising:
    storing general control preferences in a personal communication device;

communicating the general control preferences from the personal communication device to a control device, the control device changing controllable attributes in accordance with the general control preferences;

manually adjusting the controllable attributes of the controllable entity;

communicating the adjusted controllable attributes from the control device to the personal communication device; and storing the adjusted controllable attributes and a corresponding controllable entity identifier in the personal communication device.

21. An apparatus comprising:

a control device controlling controllable attributes of a controllable entity; and a personal communication device being capable of communicating specific and generic user control preferences to the control device, wherein the controllable attributes of the controllable entity are adjusted by the control device in accordance with the user control preferences after communicating the user control preferences communicated from the personal communication device to the control device.

22. A device comprising:

a communication unit being capable of communicating specific and generic user control preferences to a control device, wherein controllable attributes of a controllable entity are adjusted in response to the user control preferences communicated by the communication unit.

23. The device as claimed in claim 22, further comprising a storage unit to store the user control preferences.

24. The device as claimed in claim 22, wherein the device is portable and capable of wirelessly transmitting the user control preferences to the control device.

25. A control device comprising:

a receiver, capable of receiving specific user control preferences and generic user control preferences, to receive user control preferences transmitted from a personal communication device; and a controller to adjust controllable attributes of a controllable entity in accordance with the user control preferences.

26. The device as claimed in claim 25, wherein the controllable entity is an interior cabin of an automobile.

27. The device as claimed in claim 26, wherein the controllable attributes comprise at least one of the group consisting of distance of a seat from a gas pedal, height of the seat, an angle of incline of the seat, a temperature of the automobile, a radio station setting.

28. The device as claimed in claim 25, wherein the controllable entity is a hotel room.

29. The device as claimed in claim 28, wherein the controllable attributes comprise at least one of the group consisting of an interior temperature, humidity, lighting level, television volume, television channel, alarm clock volume, alarm clock awake time, preferred long distance provider, calling card numbers, network shows, television language, caption settings and preferred cable stations.

* * * * *